United States Patent
Guillez et al.

(10) Patent No.: US 6,799,789 B2
(45) Date of Patent: Oct. 5, 2004

(54) RETRACTABLE ROOF WITH A LOCKING DEVICE IMPROVING THE RIGIDITY OF THE ROOF

(75) Inventors: Jean-Marc Guillez, Cirieres (FR); Gérard Queveau, Le Pin (FR)

(73) Assignee: France Design, Le Pin (FR)

( * ) Notice: Subject to any disclaimer, the term of this patent is extended or adjusted under 35 U.S.C. 154(b) by 0 days.

(21) Appl. No.: 10/467,291

(22) PCT Filed: Dec. 3, 2001

(86) PCT No.: PCT/EP01/14079
§ 371 (c)(1),
(2), (4) Date: Aug. 5, 2003

(87) PCT Pub. No.: WO02/064391
PCT Pub. Date: Aug. 22, 2002

(65) Prior Publication Data
US 2004/0046417 A1 Mar. 11, 2004

(30) Foreign Application Priority Data
Feb. 14, 2001 (FR) ............................. 01 02015

(51) Int. Cl.[7] ................................................ B60J 7/12
(52) U.S. Cl. ................................. 296/121; 296/107.17
(58) Field of Search ........................... 296/121, 107.17, 296/120.1, 108; 292/DIG. 5

(56) References Cited

U.S. PATENT DOCUMENTS 5,490,709 A  *  2/1996  Rahn ........................... 296/122
6,520,560 B2  *  2/2003  Schutt et al. ................ 296/121
6,585,310 B1  *  7/2003  Guillez et al. .............. 296/108

FOREIGN PATENT DOCUMENTS

JP            2/155830         *  6/1990

* cited by examiner

*Primary Examiner*—Joseph D. Pape
(74) *Attorney, Agent, or Firm*—Nawrocki, Rooney & Sivertson, P.A.

(57) ABSTRACT

The retractable roof for a vehicle comprises several rigid roof elements (1, 2, 3), able to move between a position in which they cover the passenger compartment (4) of the vehicle and a position in which they are stored inside the rear boot of the vehicle, the roof elements (1, 2, 3) being, when they cover the passenger compartment (4), connected to each other and to the front and rear parts of the bodywork by locks controlled by rods (7) extending inside the roof elements, driven in rotation by an electric motor (8) housed in a rear roof element. The locks comprise, for each roof element (1, 2, 3), at least one pivoting hooked locking finger cooperating with a fixed finger (11) secured to an adjacent roof element or with a complementary fixed locking member (12, 13) secured to the front (5) or rear (6) part of the bodywork, the pivoting of each pivoting hooked locking finger being controlled by the translational movement of a nut mounted on a threaded part of one (16) of the rods driven in rotation by an electric motor (8).

8 Claims, 2 Drawing Sheets

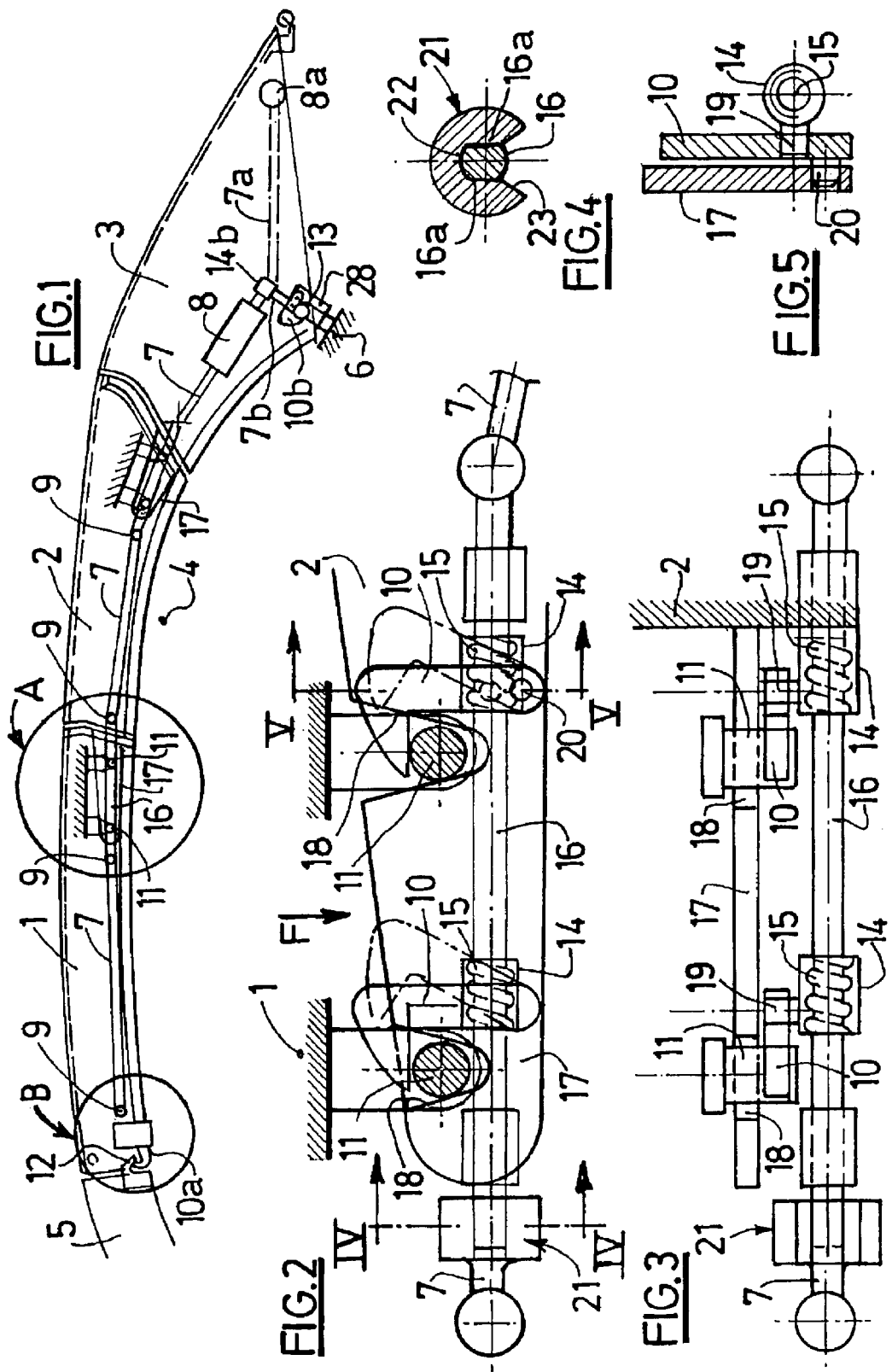

RETRACTABLE ROOF WITH A LOCKING DEVICE IMPROVING THE RIGIDITY OF THE ROOF

This application is a 371 of PCT/EP01/14079 filed Dec. 3, 2001

TECHNICAL FILED

The invention relates to a retractable roof for vehicles comprising several rigid roof elements able to move between a position in which they cover the passenger compartment of the vehicle and a position in which they are stored in the rear boot of the vehicle.

Such a retractable roof makes it possible to convert a vehicle of the saloon or coupé type into a vehicle of the cabriolet type.

BACKGROUND OF THE INVENTION

In known designs, the roof elements are, when they cover the passenger compartment, connected to each other and to the front and rear parts of the bodywork by locking means controlled by rods extending inside the roof elements, driven in rotation by an electric motor housed in a rear roof element.

Such locking means were described in the French patent application N° 99 03 234 filed in the name of the applicant.

Such a system makes it possible to centralise the control for locking the roof elements together and with the bodywork using a single electric motor.

The aim of the present invention is to improve the above locking system, so that it helps to improve the rigidity of the retractable roof, when it covers the passenger compartment of the vehicle and the roof elements are locked together and with the bodywork.

SUMMARY OF THE INVENTION

According to the invention, this retractable roof is characterised in that the locking means comprise, for each roof element, at least one pivoting locking finger with a hook, cooperating with a fixed finger secured to an adjacent roof element or with a fixed complementary locking member secured to the front or rear part of the bodywork, the pivoting of each pivoting locking finger with a hook being controlled by the translational movement of a nut mounted on a threaded part of one of the said rods driven in rotation by an electric motor.

The above locking system makes it possible to lock the roof elements together in a longitudinal direction and in a perpendicular direction, with a clamping effect obtained by means of the action of the screws on the fingers with hooks, which makes it possible to obtain connections resisting bending and twisting forces.

Thus the retractable roof equipped with such a locking system actively participates in the rigidity of the whole of the vehicle bodywork.

Other particularities and advantages of the invention will emerge below.

BRIEF DESCRIPTION OF THE DRAWINGS

In the drawings attached by way of non-limitative examples:

FIG. 1 is a schematic view in longitudinal section of a retractable roof according to the invention equipped with a locking system;

FIG. 2 is a view to an enlarged scale of detail A in FIG. 1;

FIG. 3 is a plan view in the direction of the arrow F in FIG. 2;

FIG. 4 is a view in section along the plane IV—IV in FIG. 2;

FIG. 5 is a view in section along the plane V—V in FIG. 2;

DETAILED DESCRIPTION OF THE INVENTION

Figure 6:
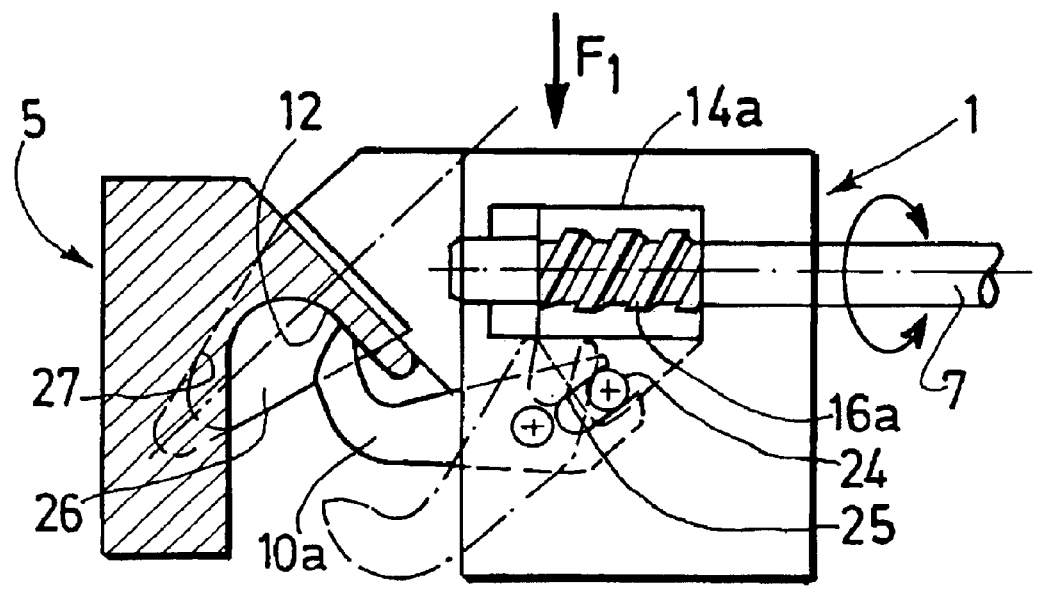
FIG. 6 is a view to an enlarged scale of detail B in FIG. 1.
Figure 7:
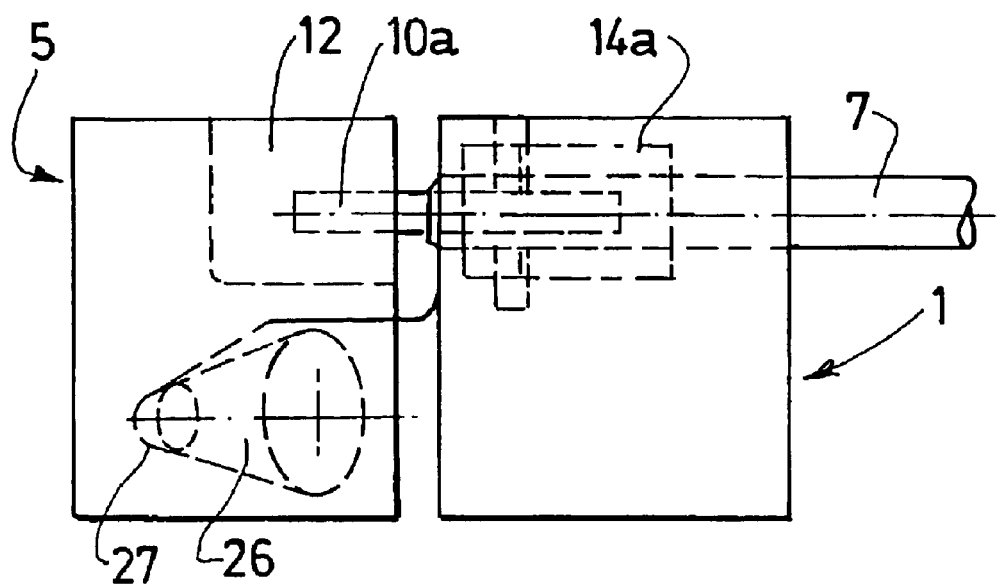
FIG. 7 is a view in the direction of the arrow $F_1$ in FIG. 6.

In the example depicted in FIG. 1, the retractable roof comprises three rigid roof elements 1, 2, 3 able to move between a position (the one depicted in FIG. 1) in which they cover the passenger compartment 4 of the vehicle and a position (not shown) in which they are stored inside the rear boot of the vehicle.

When they cover the passenger compartment 4, the roof elements 1, 2, 3 are connected to each other and to the front 5 and rear 6 parts of the bodywork by locking means controlled by rods 7 extending inside the roof elements 1, 2, 3 driven in rotation by an electric motor 8 housed in the rear roof element 3.

The rods 7 can be rigid. In this case, they are connected together by cardan joints 9. These rods 7 can also be flexible.

An electric motor 8 can be disposed on each side of the rear roof element 3. A single motor 8a could be disposed at the middle of the rear element 3 and be connected to the rods 7 by rods 7a.

In accordance with the invention, the locking means comprise (see FIGS. 2, 3, 6), for each roof element 1, 2, 3, pivoting locking fingers with hooks 10, 10a, 10b cooperating with fixed fingers 11 secured to an adjacent roof element 1, 2 or with a fixed complementary locking element 12, 13 secured to the front 5 or rear 6 part of the bodywork. The pivoting of each pivoting locking finger with hooks 10, 10a, 10b is controlled by the translational movement of a nut 14, 14a, 14b mounted on a threaded part 15 of a rod 16, 16a driven in rotation by the electric motor 8.

In the embodiment depicted, the roof elements 1, 2, 3 are associated with each other so as to be able to move with respect to each other in a transverse direction with respect to their surface, when they are moved from their position of covering the passenger compartment 4 to their position of storage in the boot.

In addition, each roof element 2, 3, with the exception of the front element 1, has on its front end a protuberance 17 engaging under the adjacent roof element 1, 2. Each protuberance 17 has two transverse slots 18, splayed and spaced apart longitudinally, able to receive two fixed locking fingers 11 secured to the adjacent roof element 1, 2.

Each protuberance 17 also carries a rod 16 mounted for rotation and connected by the rods 7 to the electric motor 8. The rod 16 has two threaded parts 15 on each of which a nut 14 is mounted. Each nut 14 has a lateral stud 19 (see FIG. 3) in engagement with a hooked locking finger 10 mounted so as to pivot on a shaft 20 secured to the protuberance 17. The hook on each locking finger 10 can come into engagement with one of the two fingers 11 engaged in a splayed slot 18 in the protuberance 17, in order to lock the finger in the corresponding slot 18.

Moreover, the end of the rotary rod 16 carried by the protuberance 17 has means 21 for coupling and uncoupling it from the end of the rod 7 carried by the adjacent roof element 1, 2 when the roof elements 1, 2, 3 are associated with each other or disconnected from each other.

As shown notably by FIG. 4, the said coupling and uncoupling means comprise a rod end 16 having two flats 16a, opposite with respect to the axis of the rod, able to engage in a complementary recess 22 formed at the end of the rod 7 carried by the adjacent roof element 1, 2.

In addition, this recess 22 opens out towards the outside through a splayed opening 23 directed in the direction of association of the roof elements, so that, during this association, the end of the rod 16 can engage in the recess 22.

As shown by FIGS. 1 and 6, the front end of the front roof element 1 carries a pivoting hook 10a able to come into engagement with a locking cavity 12 fixed to the front part 5 of the bodywork. The pivoting of this hook 10a is controlled by the translational movement of a nut 14a mounted on the threaded end 16a of a rotary rod 7. The nut 14a has a finger 24 in engagement in a groove 25 formed in the base of the hook 10a.

In addition, the front end of the front element 1 carries a conical protuberance 26 directed downwards and towards the front part 5 of the bodywork. The latter has a recess 27 able to receive the conical protuberance and has a shape complementary to the latter.

As shown by FIG. 1, the rear part 6 of the bodywork has a locking finger 13 able to engage in a splayed slot formed in a plate 28 fixed to the rear part of the rear roof element 3. A pivoting locking finger 10b is able to come into engagement with the locking finger 13 in order to lock it in the slot in the plate 28.

The pivoting of the pivoting finger 10b is controlled by the rotation of a rod 7b driven by the electric motor 8.

The functioning of the locking system which it is wished to describe will now be explained.

It will be assumed that the retractable roof had just been moved, by means of a known mechanism, from a position of storage inside the boot of the vehicle, to the covering position depicted in FIG. 1.

In this position, the rear element 3 is in contact with the rear part of the bodywork, the elements 3, 2, 1 are situated in line with each other and the front element 1 is situated opposite the front part 5 adjacent to the windscreen.

The protuberances 17 carried by the rear 3 and intermediate 2 elements are engaged under the adjacent elements 2 and 1.

In this position, the two fingers 11 carried by each of the elements 1 and 2 are engaged in the splayed slots 18 in the protuberances 17.

The hooked fingers 10, 10a, 10b are released from the fixed fingers 11, 13 and from the locking cavity 12.

In addition, the rods 7, 16 and 16a are coupled with each other.

In order to lock the assembly, it suffices to demand the starting of the electric motor 8.

This rotates the rods 7, 16, 16a, 7b.

The rotation of these rods causes the translational movement of the nuts 14, 14a, 14b and the tilting of the hooked fingers 10, 10a, 10b.

These fingers 10, 10a, 10b thus lock against the fixed fingers 11, 13 and against the internal face of the cavity 12.

The above locking system confers on the whole of the retractable roof excellent rigidity under bending and twisting.

What is claimed is:

1. A retractable roof for a vehicle, comprising several rigid roof elements (1, 2, 3), able to move between a position in which they cover the passenger compartment (4) of the vehicle and a position in which they are stored inside the rear boot of the vehicle, the roof elements (1, 2, 3) being, when they cover the passenger compartment (4), connected to each other and to the front and rear parts of bodywork by locking means controlled by rods (7) extending inside the roof elements, driven in rotation by an electric motor (8) housed in a rear roof element (3), characterised in that the locking means comprise, for each roof element (1, 2, 3), at least one pivoting hooked locking finger (10, 10a, 10b), cooperating with a fixed finger (11) secured to an adjacent roof element or with a complementary fixed locking member (12, 13) secured to the front (5) or rear (6) part of the bodywork, the pivoting of each pivoting hooked locking finger (10, 10a, 10b) being controlled by the translational movement of a nut (14, 14a) mounted on a threaded part of one (16) of said rods driven in rotation by said electric motor (8).

2. A retractable roof according to claim 1, characterised in that the roof elements (1, 2, 3) are associated with each other so as to be able to move with respect to each other in a transverse direction with respect to their surface, when they are moved from their position of covering the passenger compartment (4) to their position of storage in the boot.

3. A retractable roof according to claim 2, characterised in that each roof element (2, 3), with the exception of the front element (1), has on its front end a protuberance (17) engaging under the adjacent roof element (1, 2), said protuberance (17) having two transverse slots (18) splayed and spaced apart longitudinally and able to receive two fixed locking fingers (11) secured to the adjacent roof element (1, 2), said protuberance (17) also carrying a rod (16) mounted for rotation and connected to said electric motor (8), this rod (16) having two threaded parts (15) on each of which there is mounted a nut (14), each nut having a lateral stud (19) in engagement with a hooked locking finger (10) mounted so as to pivot on a shaft (20) fixed to said protuberance (17), the hook on each locking finger (10) being able to come into engagement with one of the two fingers (11) engaged in a splayed slot (18) in said protuberance, in order to lock said finger in said slot.

4. A retractable roof according to claim 3, characterised in that the end of the rotating rod (16) carried by said protuberance (17) has means (21) for coupling it to and uncoupling it from the end of the rod (7) carried by the adjacent roof element, when the roof elements are associated with each other or dissociated from each other.

5. A retractable roof according to claim 4, characterised in that said coupling and uncoupling means (21) comprise a rod end (16) having two flats (16a) opposite with respect to the axis of the rod, able to engage in a complementary recess (22) formed at the end of the rod (7) carried by the adjacent roof element, this recess (22) opening towards the outside through a splayed opening (23), directed in the direction of association of the two roof elements.

6. A retractable roof according to claim 1, characterised in that the front end of a first roof element (1) carries a pivoting hook (10a) able to come into engagement with a locking cavity (12) fixed to the front part (5) of the bodywork, the pivoting of this hook (10a) being controlled by the translational movement of a nut (14a) mounted on the threaded end (16a) of a rotating rod, this nut having a finger (24) in engagement in a groove (25) formed in the base of said hook (10a).

7. A retractable roof according to claim 6, characterised in that the front end of the front element (1) comprises a conical protuberance (26) directed towards the front part (5) of the bodywork, the latter having a recess (27) able to receive said conical protuberance (26) and being complementary in shape to the latter.

8. A retractable roof according to claim 1, characterised in that the rear part (6) of the bodywork of the rear roof has a locking finger (13) able to engage in a splayed slot formed in a plate (28) fixed to the rear part (6) of the rear roof element (3), a pivoting locking finger (10b) being able to come into engagement with said locking finger in order to lock it in said slot, the pivoting of said pivoting finger (10b) being controlled by the rotation of a rod (7b) driven by the electric motor (8).

* * * * *